United States Patent [19]

Young et al.

[11] Patent Number: 4,857,197
[45] Date of Patent: Aug. 15, 1989

[54] LIQUID SEPARATOR WITH TANGENTIAL DRIVE FLUID INTRODUCTION

[75] Inventors: Grant A. Young, Tulsa, Okla.; Roy D. Lister, Keller, Tex.; William D. Wakley, Broken Arrow; Steven L. Andrews, Tulsa, both of Okla.

[73] Assignee: Amoco Corporation, Chicago, Ill.

[21] Appl. No.: 212,830

[22] Filed: Jun. 29, 1988

[51] Int. Cl.$^4$ .......................................... B01D 17/038
[52] U.S. Cl. ................................ 210/512.1; 209/144; 209/211
[58] Field of Search ...................... 210/194, 197, 512.1, 210/512.2, 512.3; 209/144, 211; 55/338, 447, 450, 454, 458

[56] References Cited

U.S. PATENT DOCUMENTS 2,981,413  4/1961  Fitch ..................................... 209/211
4,378,289  3/1983  Hunter ............................... 210/512.1
4,414,112  11/1983  Simpson et al. ................... 210/512.1

FOREIGN PATENT DOCUMENTS 537771  7/1941  United Kingdom ............. 210/512.1
82/02344  7/1982  World Int. Prop. O. ....... 210/512.1

Primary Examiner—Frank Sever
Attorney, Agent, or Firm—Scott H. Brown; Fred E. Hook

[57] ABSTRACT

A liquid separator is disclosed for separating a liquid mixture into first and second liquids of different densities. The liquid separator includes a substantially conical chamber having a closed upper portion with a liquid mixture inlet therein. A first liquid collecting mechanism is provided in a lower portion of the conical chamber for collecting and removing a first separated liquid, and a second liquid collecting device surrounds the opening in the lower portion of the conical chamber for collecting and removing a second separated liquid. A return conduit mechanism is provided for returning a portion of the second separated liquid tangentially into an upper portion of the conical chamber to act as a drive fluid to cause the centrally introduced liquid mixture to rotate for effective and efficient separation.

8 Claims, 1 Drawing Sheet

LIQUID SEPARATOR WITH TANGENTIAL DRIVE FLUID INTRODUCTION

BACKGROUND OF THE INVENTION

1. Field of the Invention

The present invention relates to liquid separators useful for separating a feed mixture of at least two liquids having different densities, and, more particularly, to such a liquid separator which includes a tangential introduction of a drive fluid.

2. Setting of the Invention

The problem of efficiently separating mixtures of liquids having different densities is well known in many industrial arenas, such as in the recovery of oil. The problem of separating recovered oil from water has spawned the development of numerous types of liquid separation devices, with the most common being hydrocyclones.

A problem encountered in separating oil and water with a hydrocyclone is that the oil and water mixture is introduced at pressures of 100 to 150 psi tangentially into the hydrocyclone. The pumping of this fluid to pressure often results in the oil droplet size becoming finer and harder to remove. Furthermore, under certain temperature and liquid density circumstances, the oil and water does not effectively separate as well as desired because the oil is sheared with the water during the turbulent tangential introduction. Furthermore, introducing the oil/water slurry on the outer diameter tangential entry means that some of the oil droplets must travel all of the way from the outside of the cone to the center. By introducing the liquid mixture centrally into the hydrocyclone, the oil remains in the center as the mixture begins to spin, resulting in a shorter travel distance to effect separation.

If a central introduction of the liquid mixture is used then the separated liquids would be removed from a lower portion of the hydrocyclone. U.S. Pat. No. 4,414,112 discloses a liquid separator wherein the two separated liquids are removed through central lower openings; however, there is no disclosure or suggestion within this patent of introducing the oil and water mixture centrally within the hydrocyclone.

SUMMARY OF THE INVENTION

The present invention has been developed to overcome the foregoing deficiencies and meet the abovedescribed needs. The present invention is a liquid separator useful for separating a liquid mixture comprising first and a second liquids having different densities. The liquid separator comprises a cylindrical/conical/cylindrical chamber having a closed upper portion and a central lower opening. A liquid mixture inlet is provided near an opening in the closed upper portion for introducing the oil and water mixture centrally and coaxially into an upper portion of the liquid separator. A first liquid collecting mechanism is provided in a lower portion of the conical chamber through an opening therein for collecting and removing a first separated liquid, such as oil. A second liquid collecting mechanism is located in the lower portion of the conical chamber adjacent the first liquid collecting mechanism for collecting and removing a second separated liquid, such as water. A conduit is provided for returning a portion of the second separated liquid into the conical chamber to provide a drive fluid mechanism to cause the centrally introduced oil and water mixture to quickly begin to rotate for effective and efficient liquid separation.

DETAILED DESCRIPTION OF THE PREFERRED EMBODIMENT

A liquid separator is provided for separating a liquid mixture having first and second liquids of different densities, such as oil and water. For the purposes of the present discussion, the liquid separator will herein be described as separated oil and water mixture; however, it should be understood that the present invention can be utilized to separate mixtures of solids, gels, gas/liquids and the like.

Figure 1:
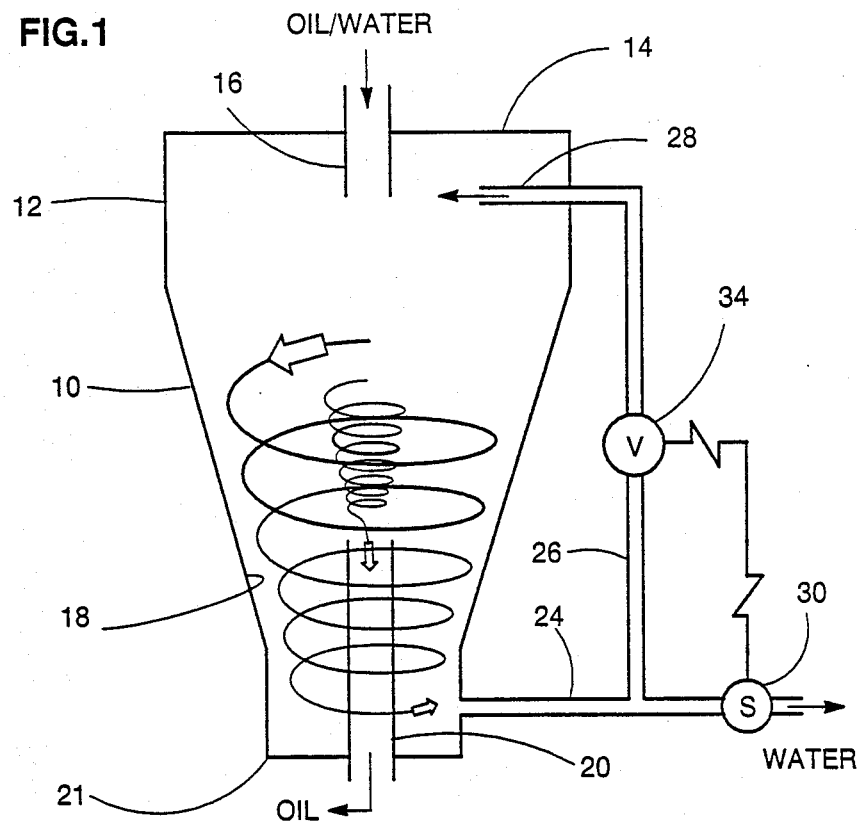
FIG. 1 is a cutaway elevational view of a liquid separator embodying at least one embodiment of the present invention.

As shown in FIG. 1, the liquid separator comprises a cylindrical/conical/cylindrical acceleration chamber 10 which can include, but does not necessarily require, a coaxial upper cylindrical chamber 12 connected to or made a part thereof. The upper cylindrical chamber 12 or an upper portion of the conical chamber 10 includes a substantially planar closed upper portion, such as a lid or top member 14. A liquid mixture inlet 16, such as an opening or a vortex finding tube or pipe, may be flush with the top or is provided in the top member 14 into the interior of the liquid separator. The inlet 16 is preferably centrally coaxially located; however, if desired, the inlet 16 can be displaced from a central position and/or tilted.

Figure 2:
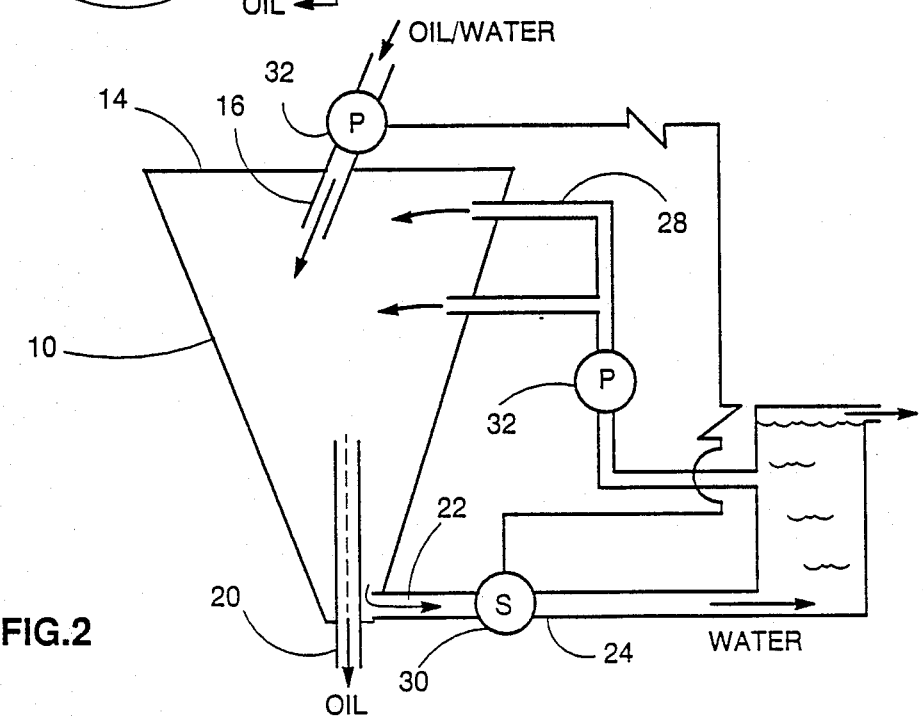
FIG. 2 is a cutaway elevational view of an alternate embodiment of the present invention.

A number of mechanisms can be used to remove the two separated liquids from a lower portion of the cylindrical chamber 10. In one embodiment the cylindrical chamber 10 includes a lower, central opening 18. A coaxial opening can be used or a vortex finder tube 20, known to those skilled in the art, acts as a mechanism to collect a first separated liquid (oil). A collection chamber or housing 21 surrounds the tube 20 and the opening 18, as shown in FIG. 1, and provides a mechanism to collect a second separated liquid (water). An alternate embodiment is shown in FIG. 2, wherein a tangentially disposed outlet 22 is provided in the lower portion of the conical chamber 10 to collect the second separated liquid (water).

As the oil and water mixture is introduced through the inlet 16, it enters and travels downwardly through the cylindrical upper chamber 12, if present, and into the conical chamber 10 where the fluid is caused to rotate. As is well known to those skilled in the art, the internal vortex within the conical chamber 10 causes the liquids of different densities to separate such that the liquid having a higher density spirals down and generally spirals adjacent the walls of the conical chamber 10, while the lighter density liquid moves coaxially into the central lower portion of the conical chamber 10.

The separated oil is passed through the opening or tube 20 and flows to further processing and storage, as is well known. The separated water is passed through the housing 21 or the tangential outlet 22 and flows to further reprocessing and discharge, as is well known, through a conduit 24.

To provide a mechanism for causing the oil and water mixture to rotate so that separation of the two fluids takes place, a portion of the separated water is routed through a return conduit 26 for return into the liquid separator. At least one tangential inlet 28 is provided in the cylindrical upper chamber 12 (if provided) and/or into an upper portion of the conical chamber 10. Because a regulated flow of fluid into the separator 10 is desired, an oil concentration sensor 30 can be used in conjunction with a pump(s) 32 and/or a valve 34 on the conduits 16, 24, 26 and 28 as shown in FIGS. 1 and 2.

The tangential inlet(s) 28 can be all on the same side of the liquid separator, spaced on opposite sides, spaced at one or more radial positions on one or more vertical positions across the surface of the cylindrical upper chamber 12 and/or conical chamber 10, as is desired. Further volute inlets can also be used.

Wherein the present invention has been described in particular relation to the drawings attached hereto, it should be understood that other and further modifications, apart from those shown or suggested herein, may be made within the scope and spirit of the present invention.

What is claimed:

1. A hydrocyclone separator useful for separating a liquid mixture having first and second liquids of different densities, the hydrocyclone separator comprising:
   means defining a substantially conical chamber having a closed upper portion and means defining a central lower opening;
   means for substantially avoiding shear on said liquid mixture when first introduced into said separator including,
   means defining an essentially vertical liquid mixture inlet within the closed upper portion for downwardly introducing the liquid mixture into the conical chamber;
   a first liquid collecting means provided in a lower portion of the conical chamber for collecting and removing a first separated liquid;
   a second liquid collecting means surrounding the central lower opening for collecting and removing a second separated liquid of a higher density; and
   piping means for returning from the central lower opening a portion of the second separated liquid tangentially into an upper portion of the conical chamber to cause the introduced liquid mixture to rotate within the hydrocyclone separator.

2. A hydrocyclone separator of claim 1 and including means defining a cyclindrical upper chamber connected coaxially to an upper portion of the conical chamber and including the liquid mixture inlet.

3. A liquid separator of claim 1 wherein the liquid mixture inlet comprising an opening in the closed upper portion.

4. A liquid separator of claim 1 wherein the first hydrocyclone collecting means comprises a vortex finder tube.

5. A liquid hydrocyclone separator of claim 4 wherein the second liquid collecting means comprises a collection chamber surrounding the vortex finder tube.

6. A liquid separator of claim 1 wherein the second liquid collecting means comprises a tangentially disposed outlet.

7. A hydrocyclone separator of claim 1 wherein the means for returning a portion of the second separated liquid comprises a return conduit in communication at one end with the second liquid collecting means and at an opposite end to at least one tangentially disposed inlet within an upper portion of the conical chamber.

8. A liquid separator of claim 7 wherein the return conduit includes a pump.

* * * * *